C. L. PITTMAN.
SAFETY ATTACHMENT FOR RAILWAY CAR TRUCKS.
APPLICATION FILED JAN. 19, 1921.
1,393,313.
Patented Oct. 11, 1921.
3 SHEETS—SHEET 1.
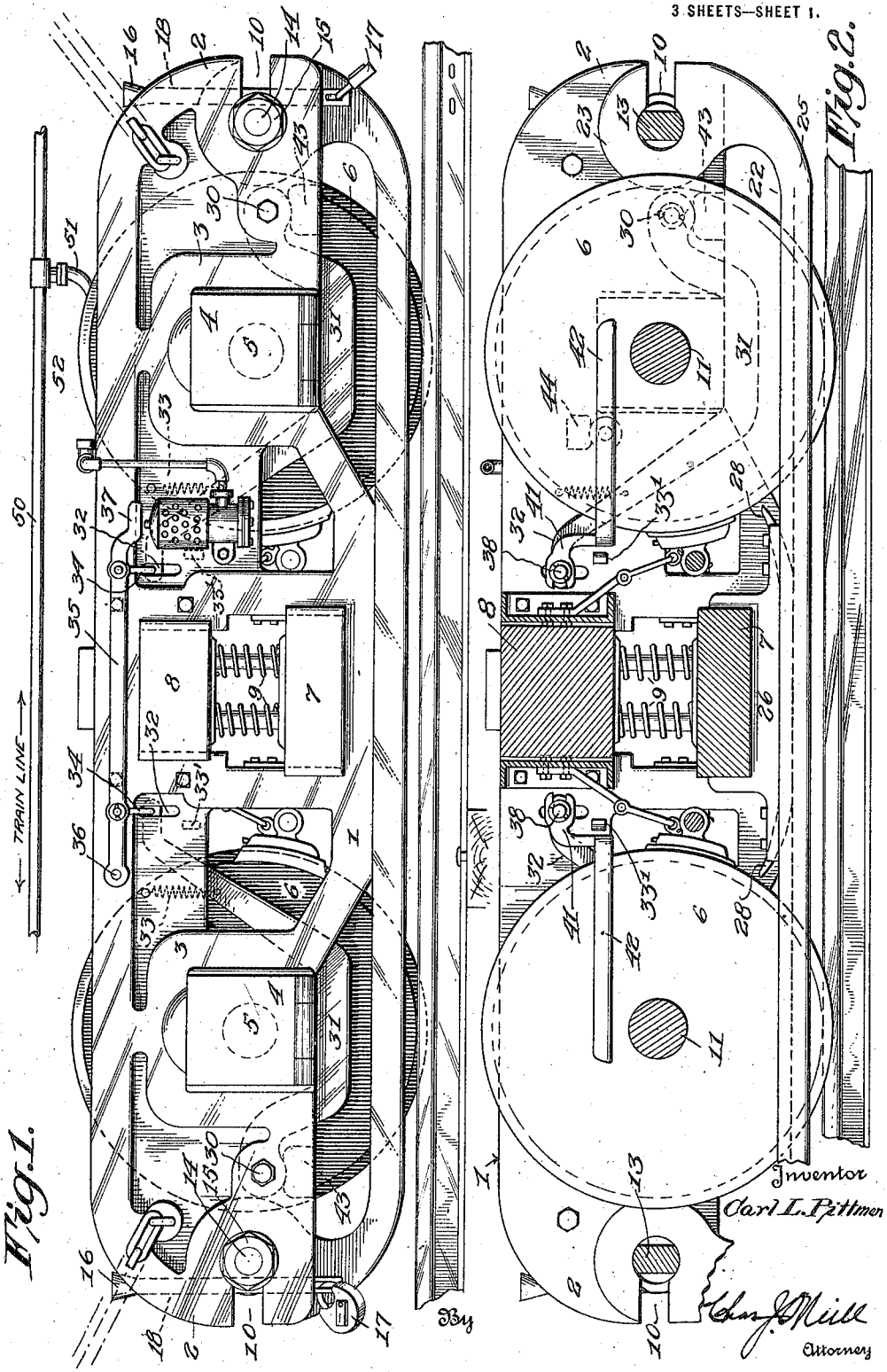

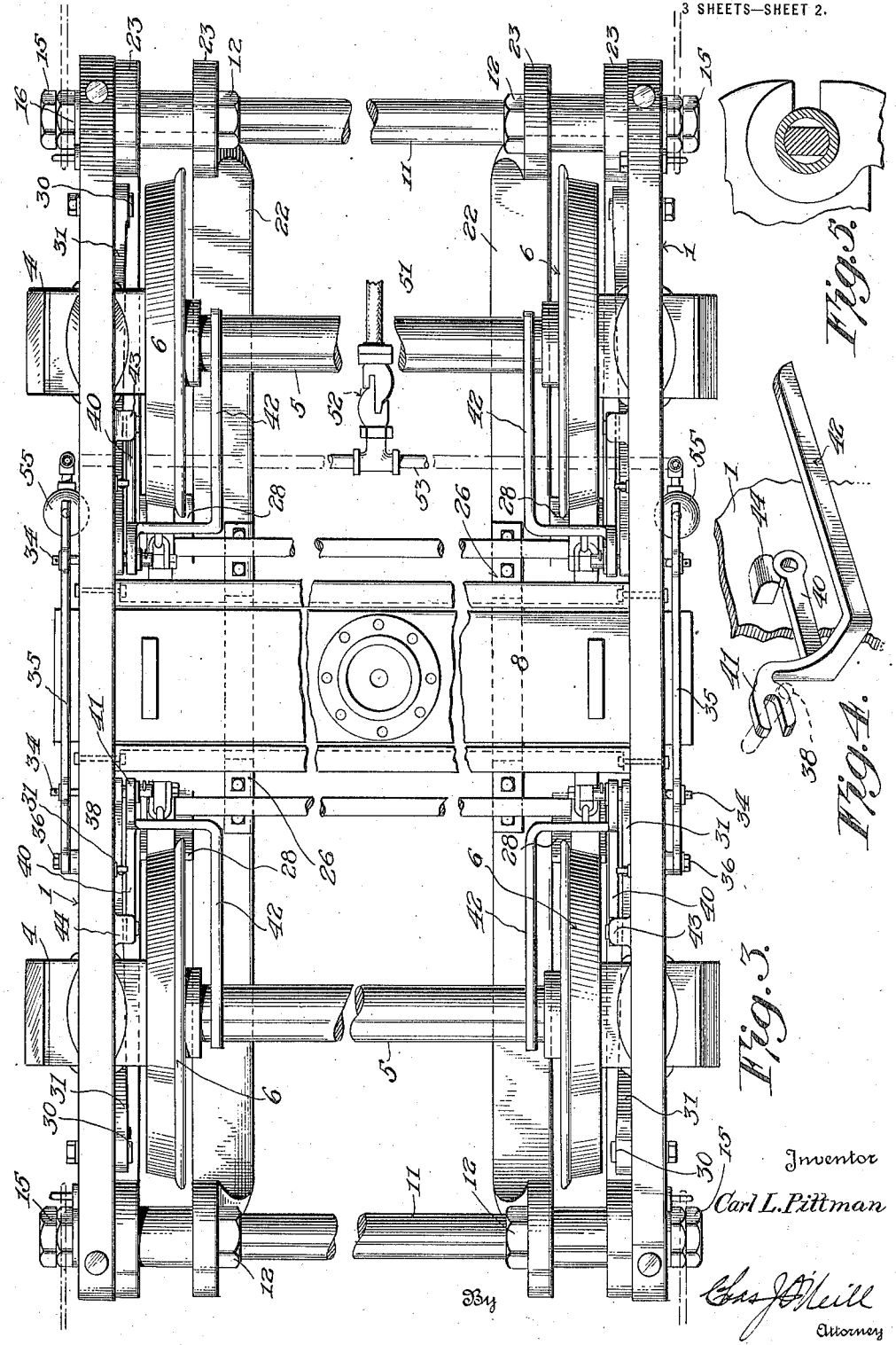

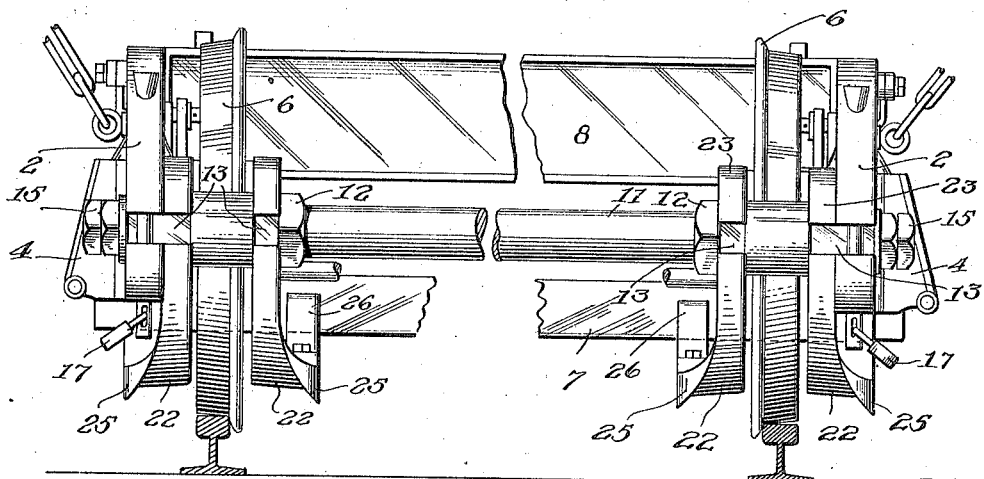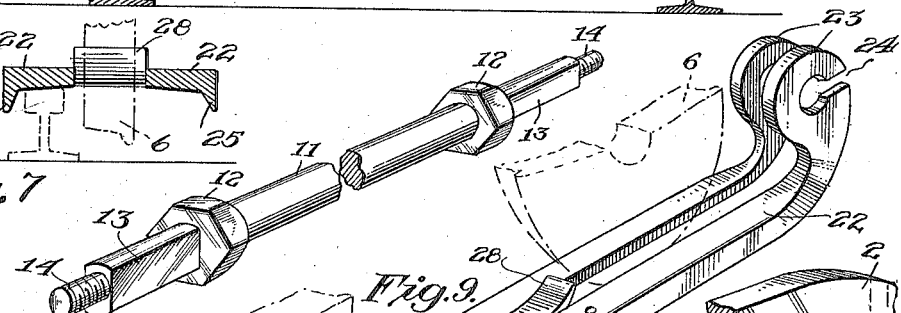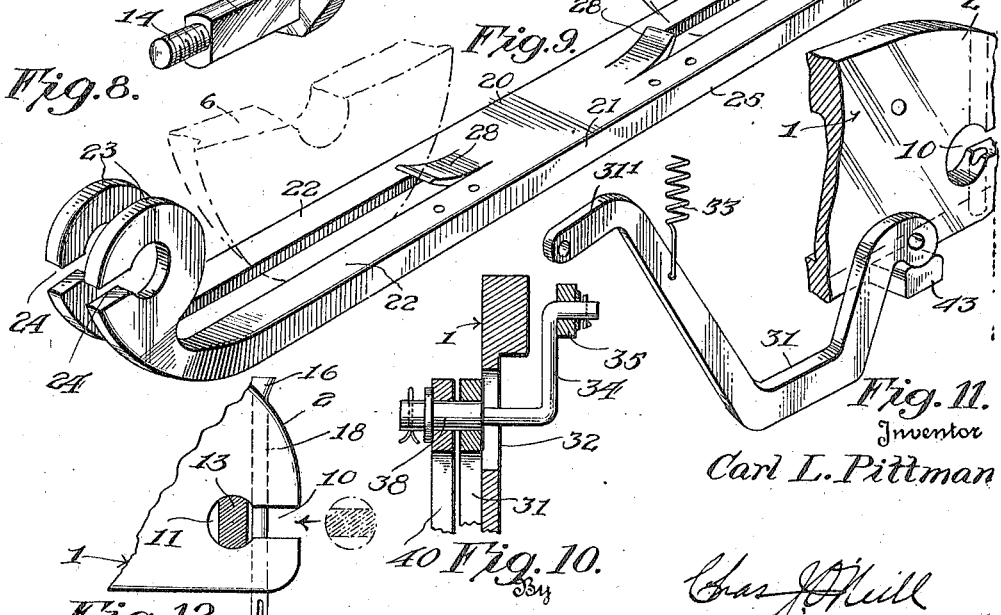

UNITED STATES PATENT OFFICE.

CARL L. PITTMAN, OF DE LEON, TEXAS, ASSIGNOR, BY DIRECT AND MESNE ASSIGNMENTS, TO PITTMAN & COMPANY, OF DE LEON, TEXAS, A JOINT STOCK ASSOCIATION CONSISTING OF JOHN NABORS, N. T. HASKINS, C. L. PITTMAN, L. C. BILLS, B. WILLIAMSON, T. S. HOLDEN, T. I. FITZGERALD, R. F. B. LOGAN, W. J. BRADLEY, W. H. WILLIAMS, AND J. B. POOL.

SAFETY ATTACHMENT FOR RAILWAY-CAR TRUCKS.

1,393,313.     Specification of Letters Patent.     Patented Oct. 11, 1921.

Application filed January 19, 1921. Serial No. 438,360.

*To all whom it may concern:*

Be it known that I, CARL L. PITTMAN, a citizen of the United States, residing at and whose post-office address is Box 274, De Leon, in the county of Comanche and State of Texas, have invented certain new and useful Improvements in Safety Attachments for Railway-Car Trucks; and I do hereby declare the following to be a full, clear, and exact description of the invention, such as will enable others skilled in the art to which it appertains to make and use the same.

This invention relates to a safety attachment for car trucks and has for its object to provide means to be applied to a car truck, which will serve, when the truck or any of the wheels thereof becomes derailed or a wheel or an axle is broken, to immediately apply the air brakes to stop the vehicle, said attachment including a unitary skid or shoe attached to and arranged on each side of the truck frame, so as to overlie the rails, straddle the lower portions of the wheels and having a central portion adapted to engage the rails, when one or more of the wheels leave the track, and support the truck. Associated with each of the shoes is a system of levers which serves to actuate a valve mechanism located in a branch of the train pipe system which controls the air brakes, certain of the elements of the lever system also serving to support the journal boxes of the wheels and axles, when the wheels leave the track, to prevent the latter coming into contact with the ties, and other elements of the lever system being so disposed in respect of the axles that breakage of an axle will actuate the air valve and apply the brakes. The invention further contemplates a novel form of connection between the shoes and the side frames of the truck, which serve to bind the elements of the truck rigidly together, but admit of the connecting devices being readily taken down to permit a damaged wheel or axle being quickly removed from the truck and replaced by another. The invention furthermore involves additional improvements and novel structures in devices of this general character, as will more particularly appear from the annexed specification, predicated upon the accompanying drawings, in which:—

Figure 1 is a side elevation of a four-wheel truck having the invention applied thereto;

Fig. 2 is a vertical longitudinal section thereof;

Fig. 3 is a plan view;

Fig. 4 is a perspective view of a portion of the lever mechanism;

Fig. 5 is a detail of the connecting devices between the shoe and the truck side frame;

Fig. 6 is an end elevation of the truck;

Fig. 7 is a vertical transverse section through one of the shoes;

Fig. 8 is a perspective view of one of the bars or bolts for connecting the shoe to the side frames of the truck;

Fig. 9 is a perspective view of one of the shoes;

Fig. 10 is a fragmentary sectional view showing the connection between certain elements of the lever mechanism for actuating the air valve;

Fig. 11 is a fragmentary perspective showing one element of the lever mechanism and its attachment to the side frame; and Fig. 12 is a fragmentary view further showing the mode of applying the connecting bolts of the side frames and the shoes.

Referring to the drawings 1, 1 indicate the side frames of the truck, which may be of the ordinary standard construction, with forward and rear extensions 2 which project beyond the wheels at each end of the truck. Each of said frames is provided with the usual housings 3 for the journal boxes 4, with which latter coöperate the axles 5 upon which the wheels 6 are secured, the housings being open at the bottom, as is usual in constructions of this type. Secured in the central openings in the side frames are the usual spring plank 7 and truck bolster 8 with the interposed springs 9.

The forward and rear ends 2 of each of the side frames 1 are provided with keyhole slots 10 having straight open throats terminating in circular openings adapted to receive a connecting bolt or bar 11 provided with spaced collars 12, the portions of the bar outside of the collars 12 being slabbed off on each side to permit the bar, when properly turned, to pass through the throat portions of the slots 10, after which the bars are turned through 90° to bring the rounded surface of the extensions 13 into engagement with the circular opening at the rear ends of slots 10. The extreme outer ends of the bars are screw threaded to receive suitable lock nuts and washers 15, which lock the elements securely together. In order to prevent unauthorized removal of the cross bolts 11, these elements are further locked into position by pins 16 passing through vertical openings 18 in the ends of the side frames, which pins are secured in position by means of suitable locks 17 engaging openings in the ends of the pins.

Suspended from the bolts 11 at each end of the truck, and lying between the collars 12 and the inner faces of the side frames, are two shoes 20, each comprising a middle section 21, lying between the wheels of the truck, and bifurcated end sections formed by bars 22, which lie on opposite sides of the adjacent wheels 6, the end of each bar 22 terminating in an eye 23 provided with a keyhole slot 24, similar to that in the ends of the side frames, and adapted to receive the flattened end of the supporting bar 11, which serves to lock the particular end of the shoe or skid to the side frame, as illustrated more particularly in Figs. 3 and 6. The middle section 21 of the skid is provided with two upturned tongues 28 lying within the slots formed between the bifurcated ends formed by the bars 22, 22, which tongues serve to divert a broken or bent rail and prevent the same rising through the open ends of the shoe to the possible damage of the latter and its coöperating elements. The underface of the shoe is slightly arched transversely, which will have the effect of causing the shoe to engage the rail as near to the median line of the shoe as possible, when one or both of the wheels coöperating with the particular shoe is derailed or broken. The outside edges of the underface of the shoe are provided with flanges 25, and the bottom of the rail engaging face of the shoe is extended laterally on both sides of the wheel to afford a broad bearing surface for engagement with the rail, as more particularly illustrated in Figs. 6 and 7.

Mounted upon the outer edge of each shoe 20, and in the mid-section thereof, is a recessed block 26, in which the extended end of the spring plank 7 engages, as shown in Fig. 2, so that, when the truck is derailed, or one or more of the wheels or axles break, and the shoe engages the track, the truck will be supported by the shoe or shoes and no part of the truck will come in contact with the rails, ties or the usual elements of the roadway.

Pivoted to each end of each side frame, on a suitable bolt 30, is bent lever 31, which passes under and engages the lower face of an adjacent journal box 4 and then extends upward, terminating in a horizontal end section 31' in which is mounted a pin 38, terminating in a cranked end 34, which projects through a slot 32 in the side frame and engages a horizontal lever 35 pivoted at 36 to the outside of the upper member of the side frame, as indicated in Figs. 1 and 10. Each of the levers 31 is held in engagement with the coöperating journal box by means of a stout helical spring 33 attached to said lever and to the adjacent side frame, and permitting the lever to move downward under the influence of the weight of the journal box and the coöperating axle of the wheel should the particular wheel leave the track or break. Each of said levers 31, however, is effective in supporting the journal box and the associated wheel and axle, in case of derailment of the wheel or the breakage thereof, and to this end downward movement of the free end of the lever 31 is limited by a lug 33' on the side frame 1. The pivoted end of each lever 31 is also supported by a lug 43 against which the rounded end of the lever engages and which lug, therefore, would also take up any undue shearing strain which might be imposed upon the pivot bolt 30. It will be noted that the levers 31 on opposite ends of the truck are connected to the same horizontal lever 35, so that said lever 35 will be actuated should either or both of the wheels leave the track or be broken. The free end of lever 35 is provided with a pendant member 37 which is adapted to engage the stem of a release valve 55 inserted in a cross pipe 53, which, in turn, is connected by a suitable coupling member 52 with an air hose, or other suitable conduit, with the main line 50 of the air brake system, so that when lever 35 is displaced the valve 55 will be actuated and thereby set the brakes.

In order to provide for the contingency of the breakage of the axles 5, or either of them, an auxiliary lever system is provided and preferably takes the form illustrated in detail in Figs. 2 and 4. Each of said auxiliary levers involves a member 40 pivoted at 43 to the inner face of said frame, a parallel member 42 which overlies the adjacent axle on the inner side of the wheel and a forked end 41 which engages the pin 38 secured to the free end of adjacent lever 31. A thrust lug 44 on the face of the side frame overlies the bearing end of the lever arm 40 and serves to take up any undue upper thrust of said lever which might tend to shear the pin 43. As a matter of convenience for adjustment and repair, the valves 55 are preferably located on the outside of the truck side frames, as indicated, and in order to avoid undue complication it is preferred that two of these valves be employed, one on each side of the truck.

From the foregoing description it will be apparent that the safety device, as described, will operate to set the air brakes should any one or all of the wheels of the truck leave the track, or should any one of the wheels or either of the axles be broken, but that, in any event, the truck will be supported on the rails by the shoe or shoes on each side of the truck, without permitting the derailed wheel or any of them coming in contact with the ties or other elements of the roadway, for the reason that the journal boxes and the associated wheels and axles will be supported by the hook like levers 31 as soon as the latter have been moved downwardly sufficiently by the weight of the superposed parts to cause the free ends of the levers to engage the thrust lugs 33'. In case of breakage of an axle at a point between the wheels thereon, the upward movement of the ruptured ends of the axle will cause the sections to engage the corresponding lever members 42, thereby actuating the horizontal levers 35 through the crank connections 34 and pins 38, thereby operating both valves 55 and applying the brakes.

The particular construction and arrangement of parts for securing the ends of the respective shoes to the side frame of the truck enables the shoes to be readily applied to or removed from operative position, and also permits either of the sets of wheels to be quickly removed for replacement in case of damage thereto. It will be noted that the cross bolts or connecting bars 11 engage corresponding seating slots 10 and 24 in the ends of the side frames and in the bifurcated ends of the shoes, so that when the bolts 11 are turned to bring the flattened surfaces of the end portions 13 thereof in alinement with the throats of the slots 10 and 24, the bolts 11 may be slid home and then turned through an angle of 90° to bring them in proper seating relation within the circular portion of the respective slots, after which the bolts are securely locked in position by means of the nuts 15 and are secured against removal by unauthorized parties by means of the pins 16 and the associated lock 17, as hereinbefore described. In order to remove a damaged set of wheels, it is only necessary to release the adjacent tie bolt 11 by reversing the operation indicated, namely, removing the pin 16, after releasing the lock 17 on the end thereof, slacking up on the nuts 15, turning the bolt 11 through 90° until the flattened sides of the end portions 13 are in alinement with the throats of the slots 10 and 24 in the side frames and shoe respectively, thereby permitting the bolts to be removed bodily. By jacking up the corresponding end of the truck and releasing the levers 31 from engagement with the journal boxes, the damaged wheel set may be pulled out and replaced by another, after which the connection between the shoes and the side frames of the trucks may be reestablished by means of the cross bolts 11, as hereinbefore explained.

It will be noted that under all conditions, which do not involve the actual bodily displacement of the truck from the immediate vicinity of the rails, any accident, such as the derailment of the wheels, the breakage of one or more of the wheels or the breakage of an axle, will cause the shoes to function to support the truck on the rails and permit the car to move smoothly along the rails until the brakes are effective to check the movement, and, furthermore, that under the conditions indicated no part of the wheels or the truck will come in contact with the crossties, the rails or any of the elements of the road bed.

What I claim is:

1. The combination of a railway car truck having side frames, safety shoes adjacent each side frame provided with bifurcated ends to straddle the truck wheels, and tie bolts to secure the corresponding ends of the side frames and ends of the shoes together to form a rigid structure.

2. The combination of a railway car truck having side frames, safety shoes adjacent each side frame provided with a solid middle section to overlie the rails and bifurcated ends to straddle the truck wheels, and tie bolts to secure the corresponding ends of the side frames and ends of the shoes together to form a rigid structure.

3. The combination of a railway car truck having side frames, safety shoes adjacent each side frame, each shoe including a solid middle section and bifurcated end sections, the latter straddling the adjacent wheels and having upturned ends, and cross bolts engaging the ends of the side frames and upturned ends of the shoes to lock the shoes rigidly to the truck frame.

4. The combination of a railway car truck having side frames extending beyond the wheels and provided with keyhole slots at their ends, safety shoes adjacent each side frame, each shoe including a solid middle section and bifurcated end sections, the latter straddling the adjacent wheels and having upturned ends provided with keyhole slots to aline with the similar slots in the side frame ends, and cross bolts having flattened sections coöperating with the slots in the side frames and shoe ends, and means for locking the bolts to the side frames.

5. The combination of a railway car truck having side frames provided with downwardly removable journal boxes, a pair of safety shoes extending longitudinally of the truck, each having a solid middle section overlying the adjacent rail and bifurcated ends straddling the wheel, said ends being removably secured to the corresponding ends of the side frames, a pivoted lever extending beneath each journal box, and means on the side frames to limit the downward movement of the respective levers and support the wheels when the latter are derailed and the shoes engage the track.

6. The combination of a railway car truck having side frames provided with downwardly removable journal boxes, a pair of safety shoes extending longitudinally of the truck, each having a solid middle section overlying the adjacent rail and bifurcated ends straddling the wheel, said ends being removably secured to the corresponding ends of the side frames, a pivoted lever extending beneath each journal box, means on the side frames to limit the downward movement of the respective levers and support the wheels when the latter are derailed and the shoes engage the track, brake valve mechanism carried by the truck, and means connecting the said levers with the brake valve mechanism to set the brakes when the truck is derailed and the journal box or boxes move downward.

7. The combination of a railway car truck having side frames provided with downwardly removable journal boxes, a pair of safety shoes extending longitudinally of the truck, each having a solid middle section overlying the adjacent rail and bifurcated ends straddling the wheel, said ends being removably secured to the corresponding ends of the side frames, a pivoted lever extending beneath each journal box, means on the side frames to limit the downward movement of the respective levers and support the wheels when the latter are derailed and the shoes engage the track, brake valve mechanism carried by the truck, means connecting the said levers with the brake valve mechanism to set the brakes when the truck is derailed and the journal box or boxes move downward, and levers overlying the axles and coöperating with the valve mechanism aforesaid to set the brakes upon breakage of an axle.

In testimony whereof I affix my signature.

CARL L. PITTMAN.